W. C. MORRILL.

LIQUID DISCHARGING DEVICE.

APPLICATION FILED DEC. 17, 1910.

Reissued Apr. 6, 1915.

13,898.

WITNESSES:

J. S. Mothershead

M. C. Rodriguez

INVENTOR

William C. Morrill

By Griffin & Bernhard

ATTORNEYS

UNITED STATES PATENT OFFICE.

WILLIAM C. MORRILL, OF NEW YORK, N. Y.

LIQUID-DISCHARGING DEVICE.

13,898. Specification of Reissued Letters Patent. Reissued Apr. 6, 1915.

Original No. 911,834, dated February 9, 1909, Serial No. 444,710. Application for reissue filed December 17, 1910. Serial No. 597,961.

*To all whom it may concern:*

Be it known that I, WILLIAM C. MORRILL, a citizen of the United States, and a resident of New York, in the county of New York and State of New York, have invented certain new and useful Improvements in Liquid-Discharging Devices, of which the following is a specification.

The invention relates to that type of liquid discharging devices which discharges the liquid in a predetermined quantity, of which a full, clear and exact description will be given hereinafter.

The invention consists in the combination of certain mechanical elements adapted to work in unison one with the other in a manner that will enable it to discharge liquids in a predetermined quantity when operated, all of which will be fully described and pointed out in the claims hereinafter.

Figure 1:
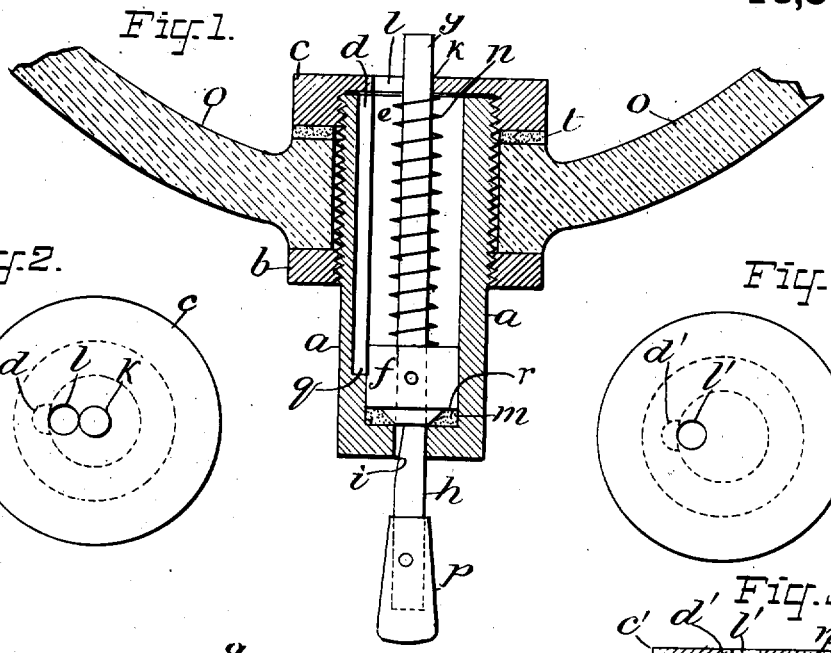
Figure 2:
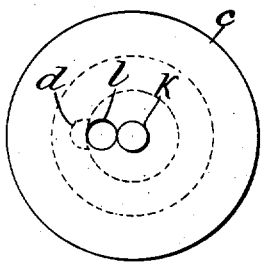
Figure 4:
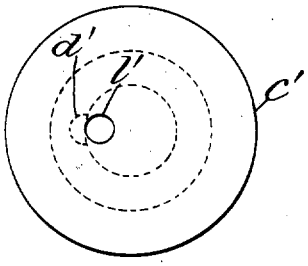
Figure 3:
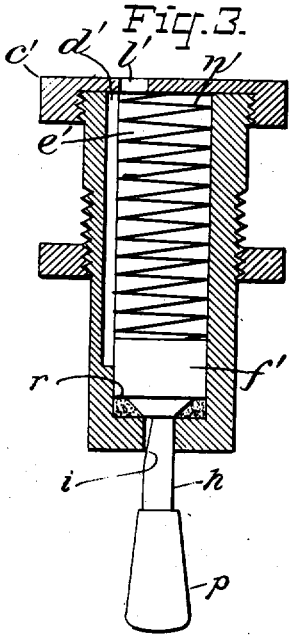
Figure 5:
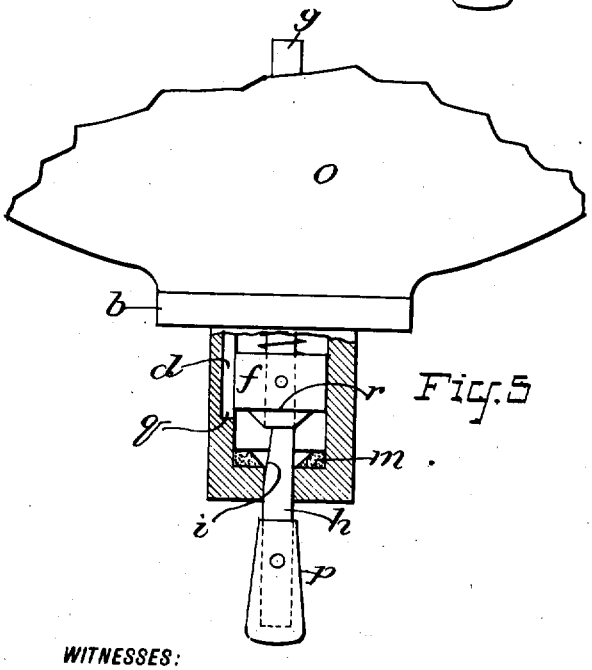

Figure 1 is a longitudinal vertical section of the discharging device showing the manner in which it is mounted upon the reservoir. Fig. 2 is a plan of the discharging device. Fig. 3 is a longitudinal vertical section of a modified form of the discharging device in which the guide rod is dispensed with. Fig. 4 is a plan of Fig. 3. Fig. 5 is a longitudinal vertical section of the discharging device illustrating the piston and its operating rod in raised positions.

Similar letters refer to similar parts throughout the drawings in which the chambered body, *a*, is shown mounted upon the reservoir, *o*, a part of which is shown in section in Fig. 1. The upper exterior circumferential surface of the body, *a* is provided with screw threads terminating at the extreme upper end of the said body, *a*. Upon the top of the said body, *a*, is mounted the internally screw threaded doubly perforated cap, *c*. The lower end of the aforesaid screw threads receives the lock nut, *b*, which when screwed up tightly, will exert sufficient pressure upon the compressible washer, *t*, to make a liquid tight joint between the perforated cap, *c*, and the wall of the reservoir.

The body, *a*, is provided with the chamber, *e*, serving as a dispensing chamber, said chamber having the feed channel, *a*, ending at *q*, opening into it.

There is within the chamber, *e*, the piston, *f*, which is capable of being operated reciprocally and which is provided with the vertically arranged guide rod, *g*, the upper end of the latter engaging with the perforation, *k*, made in the cap, *c*, and serving as a guide for the aforesaid rod. The cap, *c*, is provided with the permanently open port, *l*.

Connected with and depending from the bottom of the piston, *f*, is arranged the operating rod, *h*, which travels through a port in the bottom of the chambered body, *a*. This operating rod, *h*, is provided with the chamfer, *i*, and the push knob or button, *p*. The piston is provided with a frustum base, which, when in its normal position, seats itself into a pliable washer, *m*, the conical section of which has been purposely made a little smaller than the frustum base of the piston so that the frustum base may make for itself a perfect fitting seat and act as a conical valve. The length of the chamfer is so proportioned that the rod below it completely closes up the port through which the rod passes at the instant, or immediately before, the flat base of the piston, on its upward stroke, reaches the bottom of the channel, *d*.

In Fig. 3 is shown a modification of Fig. 1. In this figure the piston, *f'*, is shown void of the guide rod, *g*. It also shows the screw cap, *c'*, provided with a single perforation, *l'*, and an enlarged spring, *n'*, placed within the chamber, *e'*. It will be obvious that the liquid will enter at the open port, *l'*, thence to the feed channel, *d'*, in the same manner as it does in the device shown in Fig. 1.

I do not wish to confine myself strictly to the forms shown and described as it is obvious that many modifications may be employed without departing from the spirit of my invention.

The mode of operation of the apparatus, when employed for dispensing liquid soap, is as follows: When the reservoir, *o*, which at the top may be air tight, open, or partially closed, shall have been filled with liquid soap, it will then be ready for use. It will be obvious that there will always be open communication between the reservoir, *o*, and the feed channel, *d*, by means of the permanently open port, *l*. The operator places the palm of his hand beneath the push knob or button, *p*, and presses the same upward. The effect of this operation is to raise the piston or plunger, *f*, causing suction beneath the same, whereupon the external air enters below the piston through the passage produced by the chamfer, *i*, the suction of the piston and the consequent inflow of air continuing until the lower end of the chamfer has entered the opening in the bottom of the receptacle, *a*. Thereupon, the portion of the operating rod below the chamfer closes the said opening and substantially precludes any further inflow of air. When the flat face, *r*, of the piston, *f*, is raised to a point above the lower end, *q*, of feed channel, *d*, thereby establishing communication between the outlet end of feed channel, *d*, and the space below the piston, liquid soap flows into the space beneath the piston. The inflow of liquid soap displaces the air in the space below the piston, which air bubbles upwardly through the liquid above the piston. The chamber of predetermined size below the piston having been filled with liquid soap, it is confined therein so long as the opening in the bottom of the chamber, *a*, is closed by operating rod, *h*, *i. e.*, while said rod remains in its raised position. When, however, the hand of the operator is lowered into position to receive the soap, thereby releasing upward pressure on the operating stem, the spring, *n*, which by the upward movement of the piston and the rod was placed under compression, acts to quickly force piston, *f*, downward. This movement of the piston opens the port in the chamber below the piston by virtue of the chamfer on the rod, said piston acting to forcibly eject the soap into the palm of the hand. It will be observed, further, that when the piston is forced downwardly, as described, it acts to cut off further flow of soap as soon as its flat face is on a level with or below the bottom of channel, *d*.

From the foregoing description it is apparent that the piston positioned within the chamber operates in a twofold capacity, to wit, first, when said piston is lifted by hand for a predetermined distance or to a predetermined position, it operates to divide the chamber into an upper compartment and a lower compartment, said two named compartments being in communication through passage *d* whereby in said raised position of the piston the liquid flows from said upper compartment into said lower compartment, and, second, upon removing the hand pressure from the piston, the latter is impelled in a downward direction by the spring, that the piston acts to forcibly eject the liquid so admitted below said piston.

In my device, the operating rod extends a suitable distance below the chamber, so that the rod is normally exposed exteriorly of the device and is thus accessible at all times for operation by hand, thereby enabling the liquid soap to be dispensed whenever desired by the user. Furthermore, the piston operates to so control the flow of the liquid from the compartment above the piston to the compartment below it that a limited quantity of the liquid only will be dispensed; in the case of liquid soap, it is practicable to dispense it in quantity equal to two or three minims at each operation of the piston, thereby securing economy in the dispensation of the same. Upon the upward movement of the piston, the operating rod slides in the liquid outlet so as to close said outlet at the time the liquid flows into the lower compartment from the upper compartment, thus preventing the liquid so admitted to the lower compartment from escaping through the liquid outlet during the period said piston remains in said elevated position; but upon the downward movement of the piston to eject the liquid, due to the recoil of the spring, the chamfered part *i* of said rod opens the liquid outlet sufficiently for the liquid to escape freely under the pressure exerted thereon by the piston.

At the end of the downward stroke the frustum base of the piston seats itself into the conical hole of the washer, forming a conical valve which shuts off completely. This operation may be repeated at will, the operator getting the same amount of soap at each operation.

It will be obvious that there can never be a continuous open communication between the reservoir, *o*, and the exterior through the port at the bottom of the chambered body, *a*, and that, therefore, at no position of the piston, will a steady stream of soap flow, but, on the contrary, only a predetermined quantity will be discharged and a complete cycle will have to be gone through with to get each fresh supply of soap.

Having thus described my invention what I claim as new and desire to secure by Letters Patent, is:—

1. In a liquid discharging device, the combination, consisting of a chambered body having a feed channel opening therein and a valve seat, said chambered body being provided with a liquid outlet, a piston yieldingly supported and capable of being operated reciprocally within the aforesaid chamber, said piston also forming a valve, and a chamfered rod depending from the aforesaid piston, said rod fitting the liquid outlet closely except at the chamfered portion, the latter serving to open the liquid outlet when the piston moves downwardly.

2. In a liquid discharging device, a dispensing chamber provided with a liquid outlet, a piston working within the chamber, and when lifted to a position above the normal, operating as a valve to permit liquid to flow below it, and a rod for operating the piston, said rod extending below the piston and being provided with a chamfer, said rod fitting the liquid outlet closely when the rod and piston are raised so that the rod serves the fuction of a valve to control the liquid outlet, and said chamfered portion of the rod operating on the downward movement of the piston to open said liquid outlet.

3. In a liquid dispensing device, a dispensing chamber provided with a liquid outlet, a piston operable within said chamber for delivering a quantity of liquid, a rod for manually imparting movement in one direction to said piston, said rod being movable in the liquid outlet, and means for imparting movement to said piston upon the removal of hand pressure from said operating rod, said piston being free to move quickly in a direction to instantly and forcibly eject the liquid whereby a quantity of liquid is splattered upon the hand.

4. In a liquid dispensing device, the combination of a dispensing chamber provided with a liquid outlet, a piston operable within said chamber for feeding a definite quantity of liquid toward the liquid outlet, a rod attached to the piston and slidable in the liquid outlet, said rod being accessible outside of said chamber and being operable by hand for lifting the piston, and means for imparting movement to the piston upon the removal of hand pressure from said rod, said piston being free to move quickly in a downward direction and operating to forcibly and instantly eject the liquid so as to splatter the same upon the hand.

5. In a liquid discharging device, the combination with a dispensing chamber provided with a liquid outlet, of a piston within said chamber, manually operable means for moving the piston so as to control the flow of liquid into the path of the piston, and means for imparting a quick movement to the piston when the latter is free from manual control, said piston being free to move in a direction to forcibly and instantly eject a quantity of liquid, whereby the liquid is splattered upon the hand.

6. In a liquid discharging device, the combination of a dispensing chamber provided with a liquid outlet, of a piston positioned within the chamber, said piston and chamber coöperating to control the flow of a quantity of liquid into the path of the piston, hand-operated means for imparting movement to the piston, and impelling means for imparting a quick movement to said piston when free from manual control, said piston being free to move under the action of the impelling means so as to forcibly and instantly eject the liquid whereby the liquid is splattered upon the hand.

7. In a liquid discharging device, the combination with a dispensing chamber having a liquid outlet, of a piston operable within said chamber, means controllable by the movement of the piston for regulating the flow of liquid into the space below said piston, hand-operated means for moving the piston in one direction, and impelling means for moving the piston in the opposite direction, said piston being free to move under the impelling means in a direction for forcibly and instantly ejecting a quantity of liquid whereby the liquid is splattered upon the hand.

8. In a liquid dispensing device, the combination with a dispensing chamber having a liquid outlet, of a piston positioned within said chamber, a rod attached to the piston and slidable in the liquid outlet, said rod being accessible for manual control so as to impart movement to the piston and operating to close and open the liquid outlet, and impelling means coöperating with the piston for imparting quick movement thereto when hand pressure is removed from said rod, said piston being free to move under the action of the impelling means for forcibly and instantly ejecting a quantity of liquid, whereby the liquid is splattered upon the hand.

9. In a liquid soap device, the combination with a dispensing chamber, of a piston positioned therein, hand-operated means for moving the piston in a direction for feeding a definite quantity of liquid soap into the space below the piston, and a spring for imparting a quick movement to the piston when hand pressure is removed, said piston being free to move quickly under the action of said spring and in a direction for forcibly and instantly ejecting the liquid soap whereby the liquid soap is splattered upon the hand.

10. In a liquid soap device, the combination with a dispensing chamber, of a liquid ejecting member operable therein, and hand-operated means for lifting said liquid ejecting member to a position for controlling the flow of liquid soap into the dispensing chamber, said liquid ejecting member operating, upon the removal of hand pressure from said hand-operated means, to move quickly in a direction for forcibly and instantly ejecting a definite quantity of the liquid soap so as to splatter the same upon the hand.

In testimony whereof I have signed my name to this specification in the presence of two subscribing witnesses.

WILLIAM C. MORRILL.

Witnesses:
M. E. Freeman,
J. F. Mothershead.